(12) United States Patent
Wang et al.

(10) Patent No.: US 11,312,659 B2
(45) Date of Patent: Apr. 26, 2022

(54) CALCIUM-ALUMINO-SILICATE-HYDRATE NANO-SEEDS SUSPENSION AND PREPARATION METHOD THEREOF

(71) Applicant: Wuhan University of Technology, Wuhan (CN)

(72) Inventors: Fazhou Wang, Wuhan (CN); Chuanlin Hu, Wuhan (CN); Fubing Zou, Wuhan (CN); Shuguang Hu, Wuhan (CN); Mai Zhang, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 17/068,926

(22) Filed: Oct. 13, 2020

(65) Prior Publication Data
US 2021/0276919 A1   Sep. 9, 2021

(30) Foreign Application Priority Data

Mar. 5, 2020   (CN) .......................... 202010148446.4

(51) Int. Cl.
*C04B 22/00* (2006.01)
*C01B 33/26* (2006.01)
*C04B 103/14* (2006.01)

(52) U.S. Cl.
CPC .......... *C04B 22/0086* (2013.01); *C01B 33/26* (2013.01); *C04B 22/0093* (2013.01); *C01P 2002/72* (2013.01); *C01P 2002/86* (2013.01); *C01P 2004/04* (2013.01); *C04B 2103/14* (2013.01)

(58) Field of Classification Search
CPC .. C01B 33/26; C01P 2002/72; C01P 2002/86; C01P 2004/04; C04B 2103/14; C04B 22/0086; C04B 22/0093; C04B 22/00863; C04B 20/008; C04B 24/2647
See application file for complete search history.

(56) References Cited

U.S. PATENT DOCUMENTS

2011/0269875 A1 * 11/2011 Nicoleau ............. C04B 40/0042
524/2

FOREIGN PATENT DOCUMENTS

| CN | 105330194 A | 2/2016 |
| CN | 107555829 A | 1/2018 |

* cited by examiner

*Primary Examiner* — Shuangyi Abu Ali
(74) *Attorney, Agent, or Firm* — WPAT, PC

(57) ABSTRACT

The invention discloses a calcium-alumino-silicate-hydrate nano-seeds suspension and preparation method thereof. The preparation method of calcium-alumino-silicate-hydrate nano-seeds suspension includes the following steps: dropwise adding the aqueous solution of calcium source, the aqueous solution of silicon source and the aqueous solution of aluminum source to the solution of polycarboxylate superplasticizer, and adjusting the pH value to 10.0~13.5, and continuously stirring to obtain the calcium-alumino-silicate-hydrate nano-seeds suspension. The beneficial effect in the present invention is: the calcium-alumino-silicate-hydrate nano-seeds has small particle size, good dispersion stability, and it can effectively improve the early hydration and mechanical performance of cement-based materials, and has good application prospects; the preparation process is simple, without washing, drying, ultrasonic dispersion and other subsequent processes, suitable for large-scale production.

8 Claims, 4 Drawing Sheets

CALCIUM-ALUMINO-SILICATE-HYDRATE NANO-SEEDS SUSPENSION AND PREPARATION METHOD THEREOF

FIELD OF THE DISCLOSURE

The disclosure relates to a calcium-alumino-silicate-hydrate (C-A-S-H) nano-seeds suspension and preparation method thereof, which can be used as hardening accelerant for concrete and other cement-based materials.

BACKGROUND

Prefabricated concrete products are becoming more and more widely used in engineering constructions due to their fast modularization, high efficiency and high quality. Concrete materials meet the needs of the society for infrastructure construction, but they also impose a huge burden on the environment. And the cumulative amount of solid waste from the metallurgical industry, chemical industry, coal industry, electric power station, construction engineering and other industries are increasing year by year. These solid wastes occupy huge amount of land resources, and cause serious environmental pollution. To solve the above problems, the most effective way is to use these solid wastes as mineral admixtures in building materials, which have achieved good economic value and society benefit so far.

However, the use of industrial solid waste as mineral admixture has some disadvantages. For example, the large dosage of industrial solid waste in concrete would lead to the slow development of early-age strength of concrete, which is difficult to meet the requirements of the construction industry for fast construction speed and high mold turnover efficiency. The conventional methods for enhancing the early-age strength of products include the curing of cement-based materials by steam or the adding of early-strength acceleration additives, such as calcium chloride, sodium sulfate, triethanolamine, triisopropanolamine, etc. The conventional methods can rapidly improve the early-age hydration and strength development of cement-based materials in a short period, but they can also cause many problems such as the later strength of cement-based materials decreases, poor structural durability, high energy consumption for steam curing, and insufficient environmental protection.

In recent years, calcium silicate hydrate (C-S-H) nano-seeds have been synthesized and used as a new and efficient early-strength accelerator to enhance the early-age strength of cement-based materials incorporating a large dosage of mineral admixtures (such as slag powder, fly ash, calcined clay, etc.). Patent CN 201810226554.1 discloses a method for in-situ growth of C-S-H on the surface of mineral admixtures. However, the C-S-H prepared by the existing method has large particle size and poor dispersion stability. When it is used as seeding material, the effect on improving the early-age strength of cement-based materials is not so significant.

SUMMARY

A technical problem to be solved by the disclosure is that the particle size is relatively large, easy to agglomerate, when preparing C-S-H seeds from calcium and siliceous materials, which limit their ability to effectively improve the early-age compressive strength of cement-based materials.

In the first aspect, the present invention provides a preparation method of highly effective early-strength accelerator with long-term dispersion ability, i.e. C-A-S-H nano-seeds, including the following steps:

Dropwise adding the aqueous solution of calcium source, the aqueous solution of silicon source and the aqueous solution of aluminum source to the solution of polycarboxylate superplasticizer (PCE), and adjusting the pH value to 10.0~13.5, and continuously stirring to obtain the C-A-S-H nano-seeds suspension during the adding.

In second aspect, the invention provides a C-A-S-H nano-seeds suspension, which is obtained by the preparation method of the invention above.

The advantages of the technical scheme proposed in the disclosure are:

Compared with C-S-H nano-seeds without aluminum source, the C-A-S-H nano-seeds suspension provided by the invention can greatly improve the early hydration and mechanical behavior of cement-based materials with large amounts of mineral admixtures, and significantly reduce the particle size of nano-seeds, and significantly improve the dispersion stability. The C-A-S-H nano-seeds suspension realizes the non-steam-curing of prefabricated concrete products, and greatly increases the mold turnover efficiency, and thus has a good application prospect.

The preparation method mixes the aqueous solution of calcium source, the aqueous solution of silicon source, and the aqueous solution of aluminum source with the PCE solution under the specific molar ratio, temperature and pH conditions. This method is beneficial to reduce the agglomeration and the particle size of C-S-H nano-seeds. The preparation process is simple and does not require subsequent processes, such as washing, drying, and ultrasonic dispersion, which is suitable to massive production and application.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
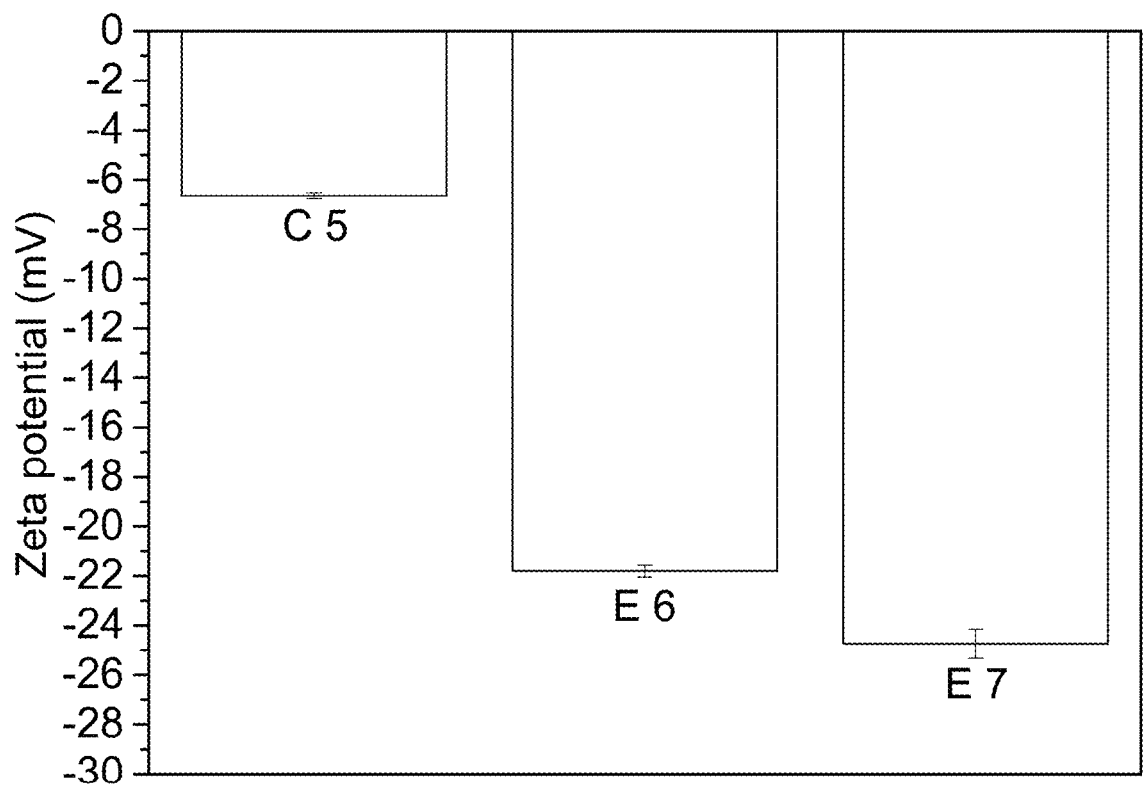
FIG. 1 is a zeta potential effect diagram of the nanoparticles suspensions obtained in Examples 6~7 and Comparative Example 5; for nano-seeds suspensions, the larger absolute value of Zeta potential, the better dispersion stability of nanoparticle suspension system; comparing to Comparative Example 5, Examples 6~7 can greatly improve the dispersion stability of nanoparticles by introducing an appropriate amount of aluminum, which provides a good guidance in the large-scale applications of C-A-S-H nano-seeds.
Figure 2:
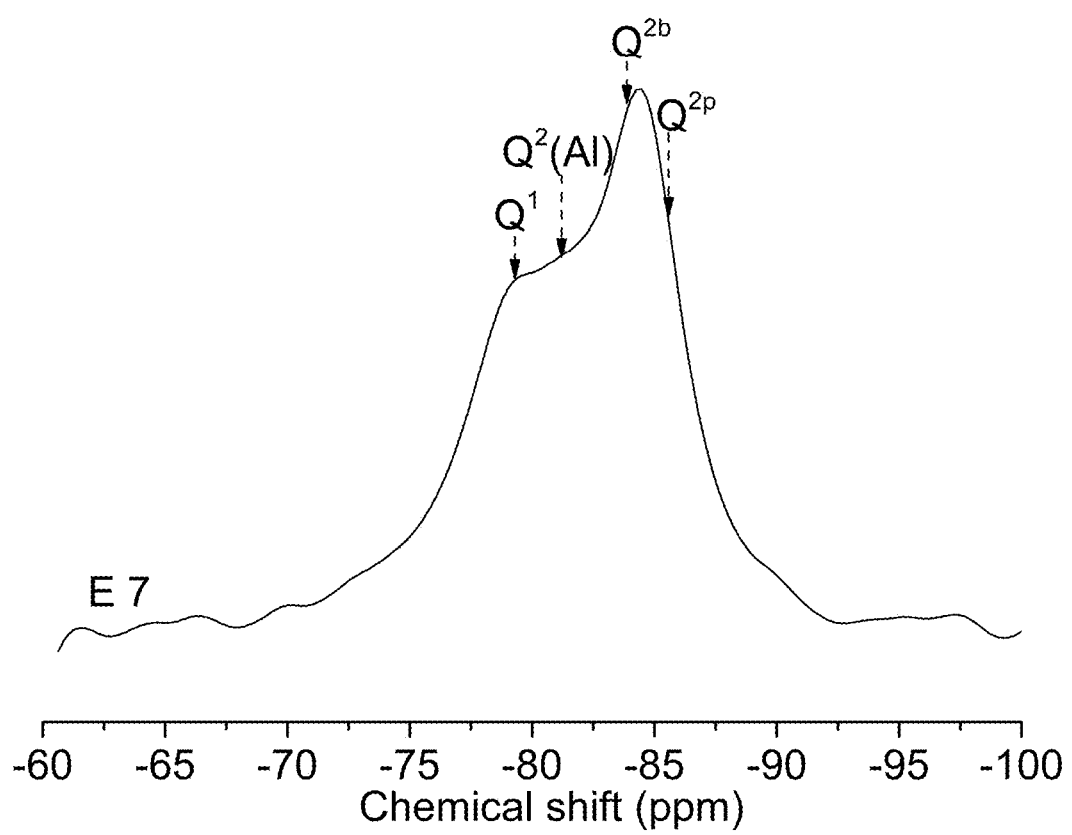
FIG. 2 is a $^{29}Si$ nuclear magnetic resonance (NMR) spectrum of Example 7; it can be seen that the aluminum is incorporated into the structure of C-S-H to form C-A-S-H.
Figure 3:
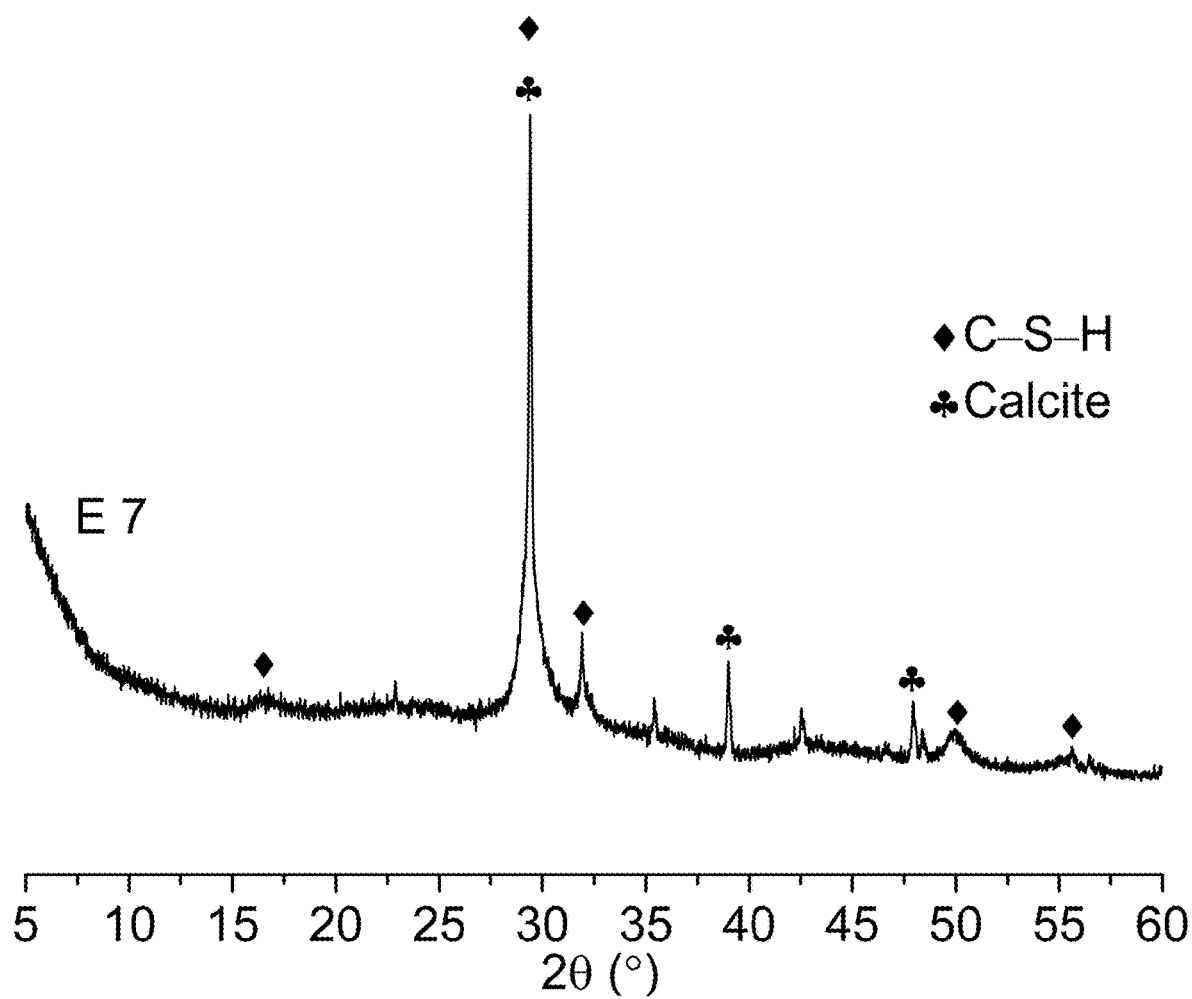
FIG. 3 is an X-ray diffraction pattern of Example 7; it can be seen that the main phase is C-A-S-H, and unavoidably the calcium carbonate is partly carbonized during sample preparation.
Figure 4:
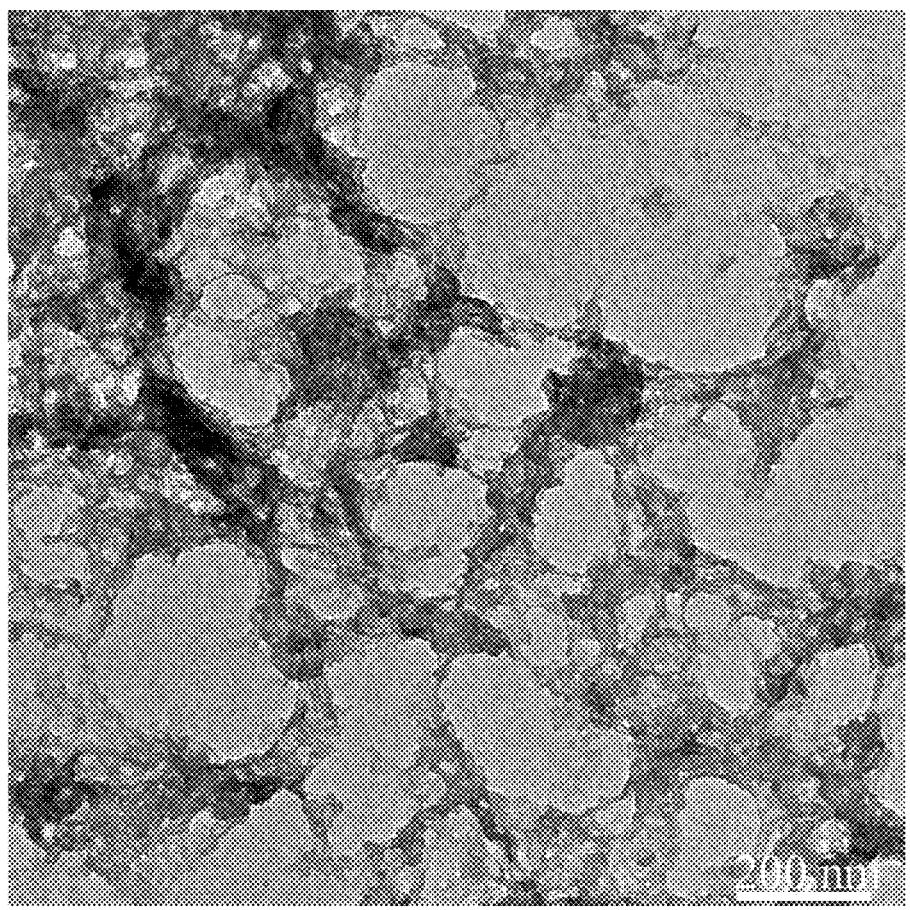
FIG. 4 is a transmission electron microscope (TEM) spectrum of Example 7; it can be seen that it is in the shape of a uniformly dispersed C-A-S-H nano-foil with a large specific surface area.

For the first aspect provided by the present invention, it is provided a preparation method of C-A-S-H nano-seeds suspension, including the following steps:

Dropwise adding the aqueous solution of calcium source, the aqueous solution of silicon source and the aqueous solution of aluminum source to the solution of PCE, and adjusting the pH value to 10.0~13.5, and continuously stirring to obtain the C-A-S-H nano-seeds suspension during the adding.

In the present invention, when synthesizing C-A-S-H nano-seeds, the introduction of a certain amount of aluminum can form an aluminum oxide tetrahedron as a bridge oxygen tetrahedron in the molecular structure, which can promote the adsorption of PCE on the surface of molecular structure, then enhance the steric hindrance of PCE, and thus greatly reduce the size of nanoparticles. Comparing to C-S-H nano-seeds without incorporating aluminum, it can significantly improve the early hydration process and mechanical properties of cement-based material. In the present invention, the pre-prepared aqueous solution of calcium source, aqueous solution of silicon source and aqueous solution of aluminum source are added dropwise to the PCE solution under continuously stirring, which is beneficial to further reduce the particle size and avoid the increase of the particle size due to the direct mixing of calcium source and silicon source to form calcium silicate, and can be used to improve the early hydration and mechanical behavior of cement-based materials with large amounts of mineral admixtures. The pH value is 10.0~13.5, which facilitates the small particle size and high dispersion stability of the obtained C-A-S-H nano-seeds suspension, and has a good early strength improvement effect on cement-based materials with large dosage of mineral admixtures.

Preferably, the calcium source is one or more of calcium formate, calcium acetate, calcium nitrate, calcium bicarbonate, and calcium gluconate.

Preferably, the silicon source is one or more of sodium fluorosilicate, magnesium fluorosilicate, sodium silicate, sodium metasilicate, and potassium silicate.

Preferably, the aluminum source is one or more of aluminum nitrate, sodium aluminate, and aluminum hydroxide.

Preferably, in the process of adding the aqueous solution of calcium source, the aqueous solution of silicon source and the aqueous solution of aluminum source to the PCE solution, the molar ratio of calcium to silicon is 0.2 to 1.8, and the molar ratio of aluminum to silicon is 0.005~1.0. Further, the molar ratio of calcium to silicon is 0.5 to 1.5, and the molar ratio of aluminum to silicon is 0.01 to 0.1.

Preferably, the raw materials for synthesizing PCE include methacrylic acid and methacrylate, and the molar ratio of methacrylic acid to methacrylate is 2:1 to 10:1. Further, the molecular weight of PCE is 10000 to 200000, the side chain contains 45 to 200 ethylene oxide units, the polymer dispersion index is controlled at 1.0 to 5.0, and the solid content is 30% to 50%.

Preferably, the concentration of the PCE solution is 2~10 wt %.

Further, in the C-A-S-H nano-seeds suspension, the molar concentration of the silicon source is 0.05~0.5 mol/L, the molar concentration of the calcium source is 0.05~0.5 mol/L, and the molar concentration of the aluminum source is 0.003~0.03 mol/L, and mass fraction of PCE is 0.8~5%. Furthermore, the molar concentration of the silicon source is 0.1 to 0.3 mol/L, the molar concentration of the calcium source is 0.15 to 0.3 mol/L, and the molar concentration of the aluminum source is 0.005 to 0.02 mol/L, and mass fraction of PCE is 1~4%.

Specifically, the PCE solution is obtained by the following steps: dispersing the PCE into water, and stirring at a speed of 200~2000 r/min for 0.5~2 h to obtain a uniformly dispersed the PCE solution. It should be noted that in this process, the pH of the PCE solution should be adjusted to 10.0~13.5 in advance, and then the pH should be adjusted to 10.0~13.5 during the dropping process, or the pH of the system should also be adjusted to 10.0~13.5 directly after the PCE solution is dispersed into water.

Preferably, in the above process of adjusting the pH, the pH is 11~12, further 11.5.

Preferably, before adding the aqueous solution of calcium source, the aqueous solution of silicon source and the aqueous solution of aluminum source dropwise to the PCE solution, it also includes:

Pre-heating or pre-cooling the aqueous solution of calcium source, the aqueous solution of silicon source, the aqueous solution of aluminum source and the PCE solution to make the temperature reach the stirring reaction temperature, so that the reaction happens at a constant temperature, and the reaction system is more stable. Specifically, the pre-heating or pre-cooling treatment step is to cool or heat the aqueous solution of calcium source, the aqueous solution of silicon source, the aqueous solution of aluminum source and the PCE solution to 5~60° C. for 0.5~2 h.

Further, the process of pre-heating or pre-cooling the above-mentioned PCE solution is carried out under stirring condition, so as to avoid the phenomenon of uneven dispersion of the PCE, which is beneficial to further improve the dispersion effect of C-A-S-H nano-seeds and avoid the phenomenon of poor nano-effect of C-A-S-H caused by agglomeration.

Preferably, in the above-mentioned process of dropping the calcium source aqueous solution, the silicon source aqueous solution and the aluminum source aqueous solution to the PCE solution, the dropping process of the three solutions is carried out simultaneously, which is convenient to improve the uniformity of the reaction system. In this process, the aqueous solution of calcium source, the aqueous solution of silicon source and the aqueous solution of aluminum source can be separately added dropwise to the PCE solution. Or the aqueous solution of calcium source and the aqueous solution of aluminum source can be pre-mixed, then simultaneously dripped into the PCE solution together with the aqueous solution of silicon source. The present invention does not limit this, as long as it can be ensured that the aqueous solution of calcium source and the aqueous solution of aluminum source come into contact with the aqueous solution of silicon source during the process of being dropped into the PCE solution, avoiding contact of calcium source aqueous solution, aluminum source aqueous solution and silicon source aqueous solution in advance to form calcium silicate or aluminum hydroxide or silicic acid precipitation, which will ultimately affect the particle size and structure of nanoparticles.

Further, the concentration of the calcium source aqueous solution is 1.6 to 2.4 mol/L, the concentration of the silicon source aqueous solution is 1 to 2 mol/L, and the concentration of the aluminum source aqueous solution is 0.02 to 0.16 mol/L. When the above three solutions are added separately and simultaneously, the volume ratio of calcium source aqueous solution, silicon source aqueous solution, aluminum source aqueous solution and PCE is 1:(0.8~1.2):(0.8~1.2):(4~6); when the solutions of the calcium source and aluminum source are mixed and dripped simultaneously with the aqueous solution of silicon source, the volume ratio of the mixed aqueous solution, aqueous solution of silicon source, and the PCE solution is 1:(0.8~1.2):(4~6), preferably 1:1:5.

Preferably, in the above-mentioned process of dropping the calcium source aqueous solution, the aqueous solution of silicon source and the aqueous solution of aluminum source to the PCE solution, the dropping speed is 0.2~5 mL/min.

Preferably, The temperature of the above-mentioned stirring reaction is 5~60° C., and the time of the stirring reaction is 0.5~24 h. During the stirring reaction, nitrogen gas is also required to prevent carbonization of the sample. Further, the temperature of the above-mentioned stirring reaction is 5~40° C.

In second aspect, the invention provides a C-A-S-H nano-seeds suspension. The C-A-S-H nano-seeds suspension is obtained by the preparation method in the first aspect of the present invention.

The C-A-S-H nano-seeds suspension obtained in the invention can be directly used in concrete products to replace the steam curing.

The present invention will be further described below in conjunction with specific embodiments. The experimental methods used in the examples are conventional methods unless otherwise specified; the materials and reagents used in the embodiments of the present invention are all purchased from the market unless otherwise specified. In the following examples and drawings, Examples 1~7 are abbreviated as E 1~7, and Comparative Examples 1~5 are abbreviated as C 1~5.

Example 1

This embodiment provides a method for preparing a C-A-S-H nano-seeds suspension, including the following steps:

(1) Pre-configuring 20 mL calcium nitrate solution with molar concentration of 2 mol/L, 20 mL sodium silicate solution with molar concentration of 2 mol/L and 20 mL aluminum nitrate solution with molar concentration of 0.06 mol/L, placing them into a constant temperature water bath at 20° C., and waiting for the temperature to stabilize;

(2) Preparing 100 mL PCE solution with solid content of 6.0%, and stirring with a magnetic stirrer for 30 min under water bath temperature of 20° C.;

(3) Using the above PCE solution as the base solution, and adjusting the pH value to 11.0 by sodium hydroxide solution with a mass fraction of 30%, and then dropwise adding the above aqueous solution of calcium source, the aqueous solution of silicon source and the aqueous solution of aluminum source to the PCE solution at a speed of 2.0 mL/min, and 30% sodium hydroxide solution or 30% dilute nitric acid was dropwise added to the reaction mixture suspension for adjusting the pH to 11.0 according to the real-time value of the pH meter, and keeping stirring at 20° C. for 6 hours after dropping to obtain the C-A-S-H nano-seeds suspension. The calcium to silicon molar ratio of the C-A-S-H nano-seeds suspension is 1.0 and the aluminum to silicon molar ratio is 0.03. Nitrogen was used as a protective gas during the synthesis to prevent the sample from carbonization.

Example 2

This embodiment provides a method for preparing a C-A-S-H nano-seeds suspension, including the following steps:

(1) Pre-configuring 20 mL calcium nitrate solution with molar concentration of 2 mol/L, 20 mL sodium silicate solution with molar concentration of 2 mol/L and 20 mL aluminum nitrate solution with molar concentration of 0.1 mol/L, placing them into a constant temperature water bath at 20° C., and waiting for the temperature to stabilize;

(2) Preparing 100 mL PCE solution with a solid content of 6.0%, and stirring with a magnetic stirrer for 30 min under water bath temperature of 40° C.;

(3) Using the above PCE solution as the base solution, and adjusting the pH value to 10.5 by sodium hydroxide solution with a mass fraction of 30%, and then dropwise adding the above aqueous solution of calcium source, the aqueous solution of silicon source and the aqueous solution of aluminum source to the PCE solution at a speed of 2.0 mL/min, and 30% sodium hydroxide solution or 30% dilute nitric acid was dropwise added to the reaction mixture suspension for adjusting the pH to 10.5 according to the real-time value of the pH meter, and keeping stirring at 40° C. for 6 hours after dropping to obtain the C-A-S-H nano-seeds suspension. The calcium to silicon molar ratio of the C-A-S-H nano-seeds suspension is 1.0 and the aluminum to silicon molar ratio is 0.05. Nitrogen was used as a protective gas during the synthesis to prevent the sample from carbonization.

Example 3

This embodiment provides a method for preparing a C-A-S-H nano-seeds suspension, including the following steps:

(1) Pre-configuring 20 mL calcium nitrate solution with molar concentration of 1.6 mol/L, 20 mL sodium silicate solution with molar concentration of 2 mol/L and 20 mL aluminum nitrate solution with molar concentration of 0.1 mol/L, placing them into a constant temperature water bath at 5° C., and waiting for the temperature to stabilize;

(2) Preparing 100 mL PCE solution with a mass fraction of 6.0%, and stirring with a magnetic stirrer for 30 min under water bath temperature of 5° C.;

(3) Using the above PCE solution as the base solution, and adjusting the pH value to 13.0 by sodium hydroxide solution with a mass fraction of 30%, and then dropwise adding the above aqueous solution of calcium source, the aqueous solution of silicon source and the aqueous solution of aluminum source to the PCE solution at a speed of 2.0 mL/min, and 30% sodium hydroxide solution or 30% dilute nitric acid was dropwise added to the reaction mixture suspension for adjusting the pH to 13.0 according to the real-time value of the pH meter, and keeping stirring at 5° C. for 6 hours after dropping to obtain the C-A-S-H nano-seeds suspension. The calcium to silicon molar ratio of the C-A-S-H nano-seeds suspension is 0.8 and the aluminum to silicon molar ratio is 0.05. Nitrogen was used as a protective gas during the synthesis to prevent the sample from carbonization.

Example 4

This embodiment provides a method for preparing a C-A-S-H nano-seeds suspension, including the following steps:

(1) Pre-configuring 20 mL calcium nitrate solution with molar concentration of 2 mol/L, 20 mL sodium silicate solution with molar concentration of 2 mol/L and 20 mL aluminum nitrate solution with molar concentration of 0.16 mol/L, placing them into a constant temperature water bath at 20° C., and waiting for the temperature to stabilize;

(2) Preparing 100 mL PCE solution with a mass fraction of 10%, and stirring with a magnetic stirrer for 30 min under water bath temperature of 30° C.;

(3) Using the above PCE solution as the base solution, and adjusting the pH value to 12 by sodium hydroxide solution with a mass fraction of 30%, and then dropwise adding the above aqueous solution of calcium source, the aqueous solution of silicon source and the aqueous solution of aluminum source to the PCE solution at a speed of 2.0 mL/min, and 30% sodium hydroxide solution or 30% dilute nitric acid was dropwise added to the reaction mixture suspension for adjusting the pH to 12 according to the real-time value of the pH meter, and keeping stirring at 30° C. for 12 hours after dropping to obtain the C-A-S-H nano-seeds suspension. The calcium to silicon molar ratio of the C-A-S-H nano-seeds suspension is 1.0 and the aluminum to silicon molar ratio is 0.08. Nitrogen is used as a protective gas during the synthesis to prevent the sample from carbonization.

Example 5

This embodiment provides a method for preparing a C-A-S-H nano-seeds suspension, including the following steps:

(1) Pre-configuring 20 mL calcium nitrate solution with molar concentration of 2.4 mol/L, 20 mL sodium silicate solution with molar concentration of 2 mol/L and 20 mL aluminum nitrate solution with molar concentration of 0.02 mol/L, placing them into a constant temperature water bath at 20° C., and waiting for the temperature to stabilize;

(2) Preparing 100 mL PCE solution with a mass fraction of 2.0%, and stirring with a magnetic stirrer for 30 min under water bath temperature of 45° C.;

(3) Using the above PCE solution as the base solution, and adjusting the pH value to 11.0 by sodium hydroxide solution with a mass fraction of 30%, and then dropwise adding the above aqueous solution of calcium source, the aqueous solution of silicon source and the aqueous solution of aluminum source to the PCE solution at a speed of 2.0 mL/min, and 30% sodium hydroxide solution or 30% dilute nitric acid was dropwise added to the reaction mixture suspension for adjusting the pH to 11.0 according to the real-time value of the pH meter, and keeping stirring at 45° C. for 1 hours after dropping to obtain the C-A-S-H nano-seeds suspension. The calcium to silicon molar ratio of the C-A-S-H nano-seeds suspension is 1.2 and the aluminum to silicon molar ratio is 0.01. Nitrogen was used as a protective gas during the synthesis to prevent the sample from carbonization.

Example 6

This embodiment provides a method for preparing a C-A-S-H nano-seeds suspension, including the following steps:

(1) Pre-configuring 20 mL mixed solution of calcium nitrate with molar concentration of 2 mol/L and aluminum nitrate with molar concentration of 0.06 mol/L, and 20 mL sodium silicate solution with molar concentration of 2 mol/L, placing them into a constant temperature water bath at 20° C., and waiting for the temperature to stabilize;

(2) Preparing 100 mL PCE solution with a mass fraction of 4.0%, and stirring with a magnetic stirrer for 30 min under water bath temperature of 20° C.;

(3) Using the above PCE solution as the base solution, and adjusting the pH value to 11.5 by sodium hydroxide solution with a mass fraction of 30%, and then the above mixed solution of calcium source aqueous solution and aluminum source aqueous solution and silicon source aqueous solution is slowly dropwise added to the PCE solution at a speed of 2.0 mL/min, and 30% sodium hydroxide solution or 65% dilute nitric acid was dropwise added to the reaction mixture suspension for adjusting the pH to 11.5 according to the real-time value of the pH meter, and keeping stirring at room temperature for 24 hours after dropping to obtain the C-A-S-H nano-seeds suspension. The calcium to silicon molar ratio of the C-A-S-H nano-seeds suspension is 1.0 and the aluminum to silicon molar ratio is 0.03. Nitrogen was used as a protective gas during the synthesis to prevent the sample from carbonization.

Example 7

This embodiment provides a method for preparing a C-A-S-H nano-seeds suspension, including the following steps:

(1) Pre-configuring 20 mL mixed solution of calcium nitrate with molar concentration of 2 mol/L and aluminum nitrate with molar concentration of 0.1 mol/L, and 20 mL sodium silicate solution with molar concentration of 2 mol/L, placing them into a constant temperature water bath at 20° C., and waiting for the temperature to stabilize;

(2) Preparing 100 mL PCE solution with a mass fraction of 4.0%, and stirring with a magnetic stirrer for 30 min under water bath temperature of 40° C.;

(3) Using the above PCE solution as the base solution, and adjusting the pH value to 11.5 by sodium hydroxide solution with a mass fraction of 30%, and then the above mixed solution of calcium source aqueous solution and aluminum source aqueous solution and silicon source aqueous solution is slowly dropwise added to the PCE solution at a speed of 2.0 mL/min, and 30% sodium hydroxide solution or 65% dilute nitric acid was dropwise added to the reaction mixture suspension for adjusting the pH to 11.5 according to the real-time value of the pH meter, and keeping stirring at room temperature for 24 hours after dropping to obtain the C-A-S-H nano-seeds suspension. The calcium to silicon molar ratio of the C-A-S-H nano-seeds suspension is 1.0 and the aluminum to silicon molar ratio is 0.05. Nitrogen was used as a protective gas during the synthesis to prevent the sample from carbonization.

Comparative Example 1

The preparation process of Comparative Example 1 is basically same as Example 1, and the difference is: preparing a mixed solution of calcium nitrate, sodium silicate and aluminum nitrate according to the molar ratio in Example 1.

Comparative Example 2

The preparation process of Comparative Example 2 is basically same as Example 1, and the difference is: controlling the pH of the dripping process to 9.

Comparative Example 3

The preparation process of Comparative Example 3 is basically same as Example 1, and the difference is: controlling the pH of the dripping process to 14.

Comparative Example 4

The preparation process of Comparative Example 4 is basically same as Example 1, and the difference is: controlling the temperature of the reaction process to 80° C.

Comparative Example 5

The preparation process of Comparative Example 4 is basically same as Example 1, and the difference is: preparing calcium nitrate solution and sodium silicate solution according to the calcium to silicon molar ratio in Example 1.

The average particles sizes of the C-A-S-H nano-seeds suspension in Examples 1~7 and Comparative Examples 1~5 were analyzed, and the results are shown in Table 1.

TABLE 1

Average particles sizes

| | E 1 | E 2 | E 3 | E 4 | E 5 | E 6 | E 7 | C 1 | C 2 | C 3 | C 4 | C 5 |
|---|---|---|---|---|---|---|---|---|---|---|---|---|
| Size (nm) | 75 | 30 | 93 | 127 | 148 | 54 | 45 | 458 | 346 | 328 | 432 | 212 |

It can be seen from Table 1 that the C-A-S-H nano-seeds suspension obtained in Examples 1~7 have much smaller particle size than those obtained in Comparative Examples 1~5, indicating that the method provided by the invention can reduce the particle size of the C-A-S-H nano-seeds. Compared with Example 1, the silicon source, calcium source and aluminum source are directly mixed to form a mixed solution in Comparative Example 1, indicating that directly mixing of the three will lead to a larger particle size. The reason is that the calcium source and the silicon source have reacted and agglomerated before adding the PCE solution. As a result, the particle size of the suspension prepared by the mixed solution of the three is larger than that prepared by dropping the three separately into the PCE solution. Therefore, in order to further reduce the particle size of nano-seeds, it is necessary to prepare the three separately to avoid the reaction between the calcium source and the silicon source. Compared with Example 1, the pH used in Comparative Example 2 is 9 and the pH used in Comparative Example 3 is 14, indicating that too high or too low pH is not conducive to obtaining the small particle size of the C-A-S-H nano-seeds. The reason is that if the pH is too high or too low, the amount of PCE adsorbed on the surface of the C-A-S-H nano-seeds will be greatly reduced. It is explained that only in the pH range provided by the present invention, the C-A-S-H nano-seeds with small particle size can be obtained. Compared with Example 1, the reaction temperature in Comparative Example 4 is 80° C., indicating that too high reaction temperature is not conducive to obtaining C-A-S-H nano-seeds with small particle size. The reason is that if the temperature is too high, it will promote the rapid growth of C-A-S-H nanoparticles, thereby increasing the particle size. Compared with Example 1, Comparative Example 5 only contains calcium nitrate solution and sodium silicate solution, and no aluminum source is added, indicating that the addition of aluminum source can significantly reduce the particle size of C-S-H nanoparticles.

According to the mortar mix proportion in Table 2, the samples from above-mentioned examples and comparative examples were tested for compressive strength. The mortar raw materials are: P·I 42.5 cement from China United Cement Corporation and the standard sand from Xiamen Aisiou Standard Sand Corporation. Different amounts of the PCE solution are used to ensure that each group of mortar has similar initial workability. The adding amount of the C-A-S-H nano-seeds obtained in Examples 1~7 and Comparative Examples 1~5 is 1.0% of the total cement mass in Table 2. Table 3 lists the compressive strength of mortar samples under standard curing conditions (temperature=20° C., relative humidity >95%) from the C-A-S-H nano-seeds obtained in Examples 1~7 and Comparative Examples 1~5. Among them, the blank sample is the mortar without adding the C-A-S-H nano-seeds and under standard curing conditions (temperature=20° C., relative humidity >95%).

According to the concrete mix proportion in Table 4, the samples from above-mentioned examples and comparative examples were tested for compressive strength. The concrete raw materials are: P·I 52.5 cement from Huaxin Cement Corporation, Grade II fly ash, S95 slag powder, river sand with a mesh number of 2.8 and coarse aggregate with particle size of 5~25 mm. Different amounts of the PCE solution are used to ensure that each group of concrete has similar initial working performance. The adding amount of the C-A-S-H nano-seeds obtained in Examples 1~7 and Comparative Examples 1~5 is 2.0% of the total cement mass in Table 2. Table 5 lists the compressive strength of concrete samples under standard curing conditions (temperature=20° C., relative humidity >95%) from the C-A-S-H nano-seeds obtained in Examples 1~7 and Comparative Examples 1~5. Among them, the blank sample is the concrete without the addition of the C-A-S-H nano-seeds and under standard curing conditions (temperature=20° C., relative humidity >95%).

TABLE 2

Mix proportion of mortar

| Cement | Standard sand | Water |
|---|---|---|
| 450 g | 1350 g | 157.5 g |

TABLE 3

Compressive strength of mortar at 8 h

| Sample | Compressive strength of mortar-8 h (MPa) |
|---|---|
| Blank | 1.6 ± 0.2 |
| E 1 | 11.8 ± 0.3 |
| E 2 | 9.3 ± 0.2 |
| E 3 | 8.3 ± 0.2 |
| E 4 | 10.6 ± 0.3 |
| E 5 | 7.6 ± 0.1 |
| E 6 | 13.4 ± 0.5 |
| E 7 | 14.6 ± 0.6 |
| C 1 | 1.2 ± 0.2 |
| C 2 | 3.3 ± 0.3 |
| C 3 | 3.6 ± 0.3 |
| C 4 | 2.5 ± 0.3 |
| C 5 | 6.2 ± 0.3 |

TABLE 4

Mix proportion of concrete (kg/m$^3$)

| Cement | Fly ash | Slag powder | River Sand | Coarse aggregate | Water |
|---|---|---|---|---|---|
| 380 | 70 | 120 | 720 | 992 | 148 |

TABLE 5

Compressive strength of concrete at different ages

| Sample | PCE (%) | Compressive strength (MPa) | | | | | |
|---|---|---|---|---|---|---|---|
| | | 8 h | 12 h | 1 d | 3 d | 7 d | 28 d | 90 d |
| Blank | 0.13 | — | 12.6 | 25.4 | 38.6 | 52.5 | 56.9 | 62.7 |
| E 1 | 0.28 | 17.7 | 30.5 | 40.6 | 52.4 | 59.9 | 64.6 | 72.8 |
| E 2 | 0.34 | 19.2 | 34.7 | 44.7 | 56.9 | 64.7 | 71.7 | 76.5 |
| E 3 | 0.23 | 15.5 | 23.6 | 38.9 | 48.6 | 58.8 | 62.3 | 70.3 |
| E 4 | 0.25 | 13.0 | 22.8 | 36.9 | 46.8 | 58.2 | 61.6 | 64.2 |
| E 5 | 0.26 | 12.2 | 21.7 | 34.3 | 45.5 | 56.9 | 61.0 | 63.2 |
| E 6 | 0.21 | 20.6 | 34.1 | 45.8 | 55.4 | 65.7 | 72.6 | 78.8 |
| E 7 | 0.24 | 24.4 | 36.6 | 47.3 | 57.6 | 68.9 | 74.3 | 80.6 |
| C 1 | 0.32 | 4.6 | 15.6 | 28.5 | 40.4 | 50.8 | 60.2 | 63.2 |
| C 2 | 0.37 | 5.7 | 16.6 | 30.7 | 40.1 | 52.3 | 62.4 | 62.8 |
| C 3 | 0.31 | 6.2 | 17.1 | 31.5 | 41.6 | 53.8 | 62.8 | 64.5 |
| C 4 | 0.38 | 4.3 | 15.2 | 28.1 | 39.6 | 51.2 | 60.5 | 64.3 |
| C 5 | 0.36 | 10.9 | 20.8 | 32.9 | 42.3 | 54.9 | 60.2 | 66.8 |

It can be seen from Table 3 that, compared with Comparative Examples 1~5, Examples 1~7 have better seeding effects, and the compressive strength of the mortar of Example 7 with the best performance can reach nearly 15 MPa at 8 h.

It can be seen from Table 4 that using the C-A-S-H nano-seeds suspension obtained in Examples 1~7, the compressive strength of concrete can reach over 12 MPa within 8 hours. In addition, in the later stage of concrete, compared with the blank sample and Comparative Examples 1~5, the compressive strength of Examples 1~7 is still significantly improved at 90 days, indicating that the C-A-S-H nano-seeds suspension prepared by the present invention will not reduce the long-term mechanical properties and durability of the concrete.

In summary, compared with steam curing, the C-A-S-H nano-seeds suspension provided by the present invention can significantly increase the early strength of cement-based materials, and will not reduce their long-term strength. Compared with pure C-S-H nano-seeds, adding a very small amount of aluminum source can greatly improve long-term dispersion ability and the effect on the early-strength of cement-based materials. It provides new idea for the preparation of highly efficient C-A-S-H nano-seeds for engineering applications in the future.

The above descriptions are only preferred embodiments of the present invention and are not intended to limit the present invention. Any modification, equivalent replacement, improvement, etc. made within the spirit and principle of the present invention shall be included in the protection of the present invention.

What is claimed is:

1. A preparation method of calcium-alumino-silicate-hydrate nano-seeds suspension, including the following steps:
   dropwise adding an aqueous solution of calcium source, an aqueous solution of silicon source and an aqueous solution of aluminum source to a solution of polycarboxylate superplasticizer, adjusting a pH value to 10.0~13.5, and continuously stirring to obtain the calcium-alumino-silicate-hydrate nano-seeds suspension, wherein the calcium to silicon molar ratio is 0.2 to 1.8, and the aluminum to silicon molar ratio is 0.01 to 1.0,
   wherein the stirring is carried out at a temperature of 5~60° C. for 0.5~24 h and nitrogen gas is supplied during the stirring to prevent carbonization;
   wherein raw materials for synthesizing polycarboxylate superplasticizer comprises methacrylic acid and methacrylate, wherein the methacrylic acid to methacrylate molar ratio is 2:1 to 10:1;
   wherein the polycarboxylate superplasticizer has a molecular weight of 10000 to 200000, a side chain contains containing 45 to 200 ethylene oxide units and a polymer dispersion index of 1.0 to 5.0;
   wherein the solution of polycarboxylate superplasticizer having a solid content of 30%-50% is obtained by the following steps:
   dispersing the polycarboxylate superplasticizer into water, and
   stirring at a speed of 200~2000 r/min for 0.5~2 h.

2. The preparation method of the calcium-alumino-silicate-hydrate nano-seeds suspension according to claim 1, wherein the aqueous solution of calcium source is one or more of calcium formate, calcium acetate, calcium nitrate, calcium bicarbonate and calcium gluconate.

3. The preparation method of the calcium-alumino-silicate-hydrate nano-seeds suspension according to claim 1, wherein the aqueous solution of silicon source is one or more of sodium fluorosilicate, magnesium fluorosilicate, sodium silicate, sodium metasilicate and potassium silicate.

4. The preparation method of the calcium-alumino-silicate-hydrate nano-seeds suspension according to claim 1, wherein the aqueous solution of aluminum source is one or more of aluminum nitrate, sodium aluminate and aluminum hydroxide.

5. The preparation method of the calcium-alumino-silicate-hydrate nano-seeds suspension according to claim 1, wherein a mass fraction of the solution of polycarboxylate superplasticizer is 2~10 wt %.

6. The preparation method of the calcium-alumino-silicate-hydrate nano-seeds suspension according to claim 5, in the calcium-alumino-silicate-hydrate nano-seeds suspension, the molar concentration of the silicon source is 0.05~0.5 mol/L, the molar concentration of the calcium source is 0.05~0.5 mol/L, the molar concentration of the aluminum source is 0.003~0.03 mol/L, and a mass fraction of the solution of polycarboxylate superplasticizer is 0.8~5%.

7. The preparation method of the calcium-alumino-silicate-hydrate nano-seeds suspension according to claim 1, before adding the aqueous solution of calcium source, the aqueous solution of silicon source and the aqueous solution of aluminum source to the solution of polycarboxylate superplasticizer, it also includes:
   pre-heating or pre-cooling the aqueous solution of calcium source, the aqueous solution of silicon source, the aqueous solution of aluminum source and the solution of polycarboxylate superplasticizer.

8. The preparation method of the calcium-alumino-silicate-hydrate nano-seeds suspension according to claim 1, wherein the aqueous solution of calcium source, the aqueous solution of silicon source and the aqueous solution of aluminum source are simultaneously dropwise added to the solution of polycarboxylate superplasticizer with a speed of 0.2~5 mL/min.

* * * * *